US008360612B2

(12) United States Patent
Redpath et al.

(10) Patent No.: US 8,360,612 B2
(45) Date of Patent: Jan. 29, 2013

(54) LASER LIGHTING APPARATUS AND METHOD

(76) Inventors: Richard Redpath, Cary, NC (US); James Redpath, Cary, NC (US)

( * ) Notice: Subject to any disclaimer, the term of this patent is extended or adjusted under 35 U.S.C. 154(b) by 185 days.

(21) Appl. No.: 12/780,882

(22) Filed: May 15, 2010

(65) Prior Publication Data

US 2011/0280006 A1 Nov. 17, 2011

(51) Int. Cl.
*G02B 27/20* (2006.01)

(52) U.S. Cl. ......................... 362/259; 362/101; 348/774

(58) Field of Classification Search .................. 362/259, 362/101; 348/774

See application file for complete search history.

(56) References Cited

U.S. PATENT DOCUMENTS

| | | | | | |
|---|---|---|---|---|---|
| 6,150,943 | A * | 11/2000 | Lehman et al. | ............... | 340/628 |
| 2004/0047145 | A1 * | 3/2004 | Koren | ........................... | 362/101 |
| 2009/0067459 | A1 * | 3/2009 | Mizuuchi et al. | ............... | 372/25 |
| 2009/0185377 | A1 * | 7/2009 | Johnson | ........................ | 362/259 |
| 2011/0157486 | A1 * | 6/2011 | Murata et al. | ................. | 348/744 |

* cited by examiner

*Primary Examiner* — Evan Dzierzynski

(74) *Attorney, Agent, or Firm* — Ming Chow; Sinorica, LLC

(57) ABSTRACT

Disclosed is a laser light system for narrow hallways, a night light for small rooms, and a fire evacuation system. The system provides a means for less infrastructure to light narrow and small areas as well as directional lighting for fire escape.

6 Claims, 6 Drawing Sheets

500

LASER LIGHTING APPARATUS AND METHOD

BACKGROUND OF INVENTION

Proper area lighting is difficult for narrow hallways and small rooms. It is common for an infrastructure of wiring and or fiber optics to be utilized to achieve lighting along stepped areas or simply to have a wide reflective base light such as a plug in night light for radial illumination or side wall mounted units.

Prior art which demonstrates the need for complex infrastructures is a laser light fire evacuation system in which columns of laser light are wired into the ceiling using fiber optics and embedded laser diodes controlled by a central unit with possible mechanical apparatus such as a rotating mirror adding many points of failure. Laser light is used in this fire escape system to overcome the less visibility of the sequencing of lights when the smoke becomes thick. Additionally the columns of light are serially staged to turn on as to lead for escape. Unfortunately the laser light is not used to project dots of light refracting (bending) on the surfaces to identify planes radiating along the way to guide an individual toward the exit in providing depth perception and forward visibility. In some instances the ceiling maybe fire lit with limited smoke as to interpret columned lights pointing down further away as well as disabling part of the infrastructure for staged serial lighting for the prior art.

Other prior art is the use of fiber optics for wall mounted units or light strips along the path of a hallway for area illumination. Common prior art is simply to place plug in night lights along the hall way which illuminate areas with radial light for coned illumination if electrical sockets had been planned in advance.

In this respect, the Laser Lighting Apparatus and Method substantially departs from the conventional design of the modern day purchasable system prior art and in doing so provides an improved fire escape system providing depth perception and forward visibility. Additionally narrow area lighting utility is enabled without the need for more complex lighting connection infrastructure.

BRIEF SUMMARY OF INVENTION

The invention relates to a laser lighting apparatus for narrow hallways for limited infrastructure setup to achieve area illumination.

Another object of the invention is for a night light for small room illumination as to provide points of light that cover a broader area instead of the common radial light feature used in modern lighting.

It is a further object of the invention for a directional fire evacuation system that can dot light a individual to lead them toward the exit there by providing depth perception and forward visibility. Additionally, the system is to provide a less complicated infrastructure for installation and less failure points to operate as well as some aspects to be more successful for exit paths to be acknowledge that maybe blocked by flames and limited smoke.

Still further other objects of the invention is for pool lighting which can provide a compelling light feature for underwater illumination. As well as pool areas to be illuminated with dots to outline the pool bounds clearly and water areas with distorted dots.

DETAIL DESCRIPTION OF THE INVENTION

Figure 1:
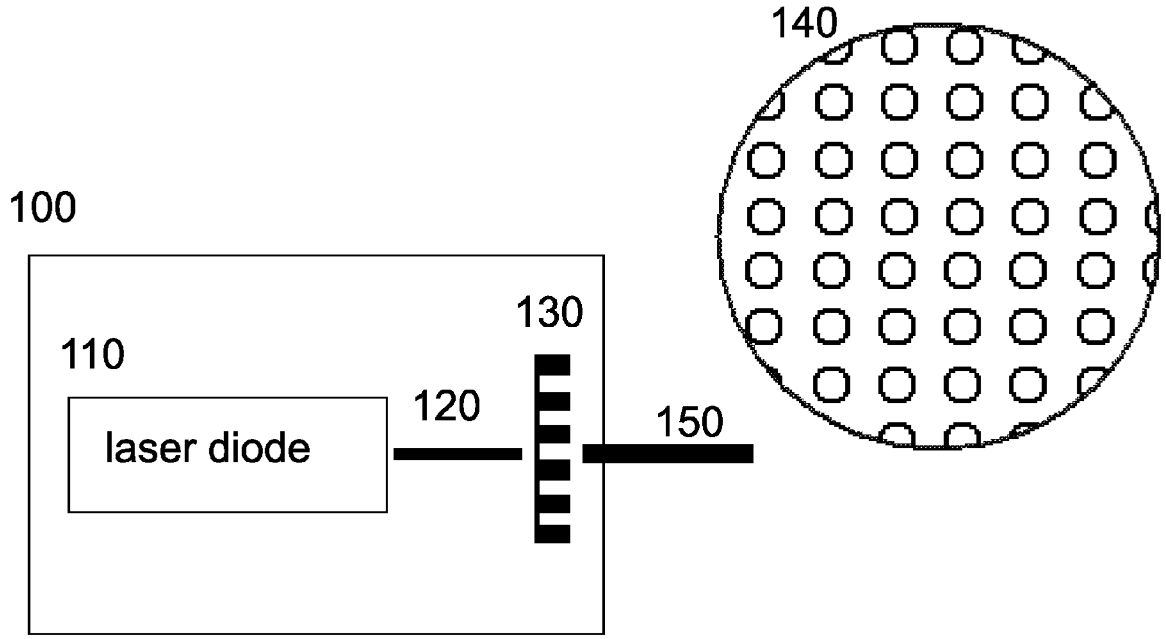
FIG. 1 is diagram of the embodiment operation.

Referring to FIG. 1 at 100 is the embodiment which is constructed of a laser diode at 110 producing a beam at 120 to be incident with diffraction grating at 130. At 140 is a cross section of the output beam at 150 from the diffraction grating at 130. One skilled in the art of creating enclosures for lighting can be referenced to apply an enclosure for the embodiment as a product.

Figure 2A:
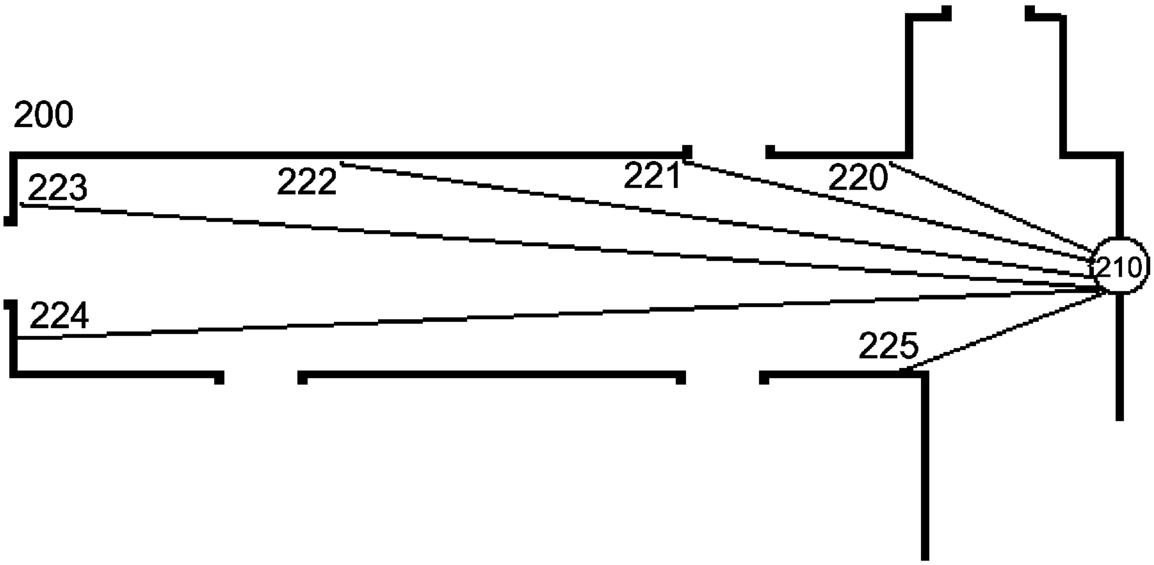
FIG. 2*a*-*b* is diagram of the embodiment operation usage for narrow area illumination.

Referring to FIG. 2*a* at 200 is an architectural drawing for a hallway. At 210 the embodiment in FIG. 1 at 100 is placed as to illuminate the hallway at 200. More specifically referring to FIG. 1 at 150 the diffraction output is positioned as to illuminate the hallway in FIG. 2*a* at 200. At 220 thru 225 the diffraction grating output in FIG. 1 at 150 will incident three dimensionally the hallway referring to FIG. 2*a* at 200 producing dots and lines for a very complete illumination of a narrow area.

Figure 2B:
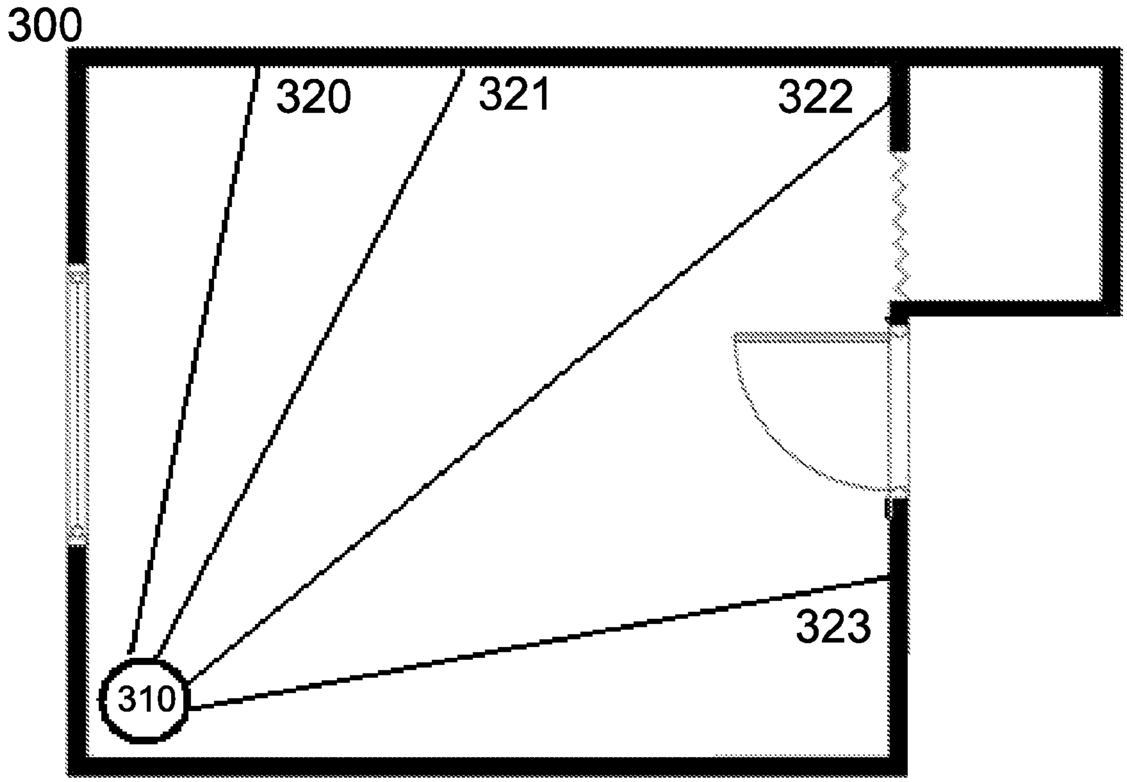

Referring to FIG. 2*b* at 300 is an architectural drawing for a small room. The embodiment in FIG. 1 at 100 is placed at 310 in FIG. 2*b*. More specifically referring to FIG. 1 at 150 the diffraction output is positioned as to illuminate the room in FIG. 2*b* at 300. At 320 thru 323 the diffraction grating output in FIG. 1 at 150 will incident three dimensionally the room at referring to FIG. 2*b* at 300 producing a broad ranged night light illumination.

Figure 3A:
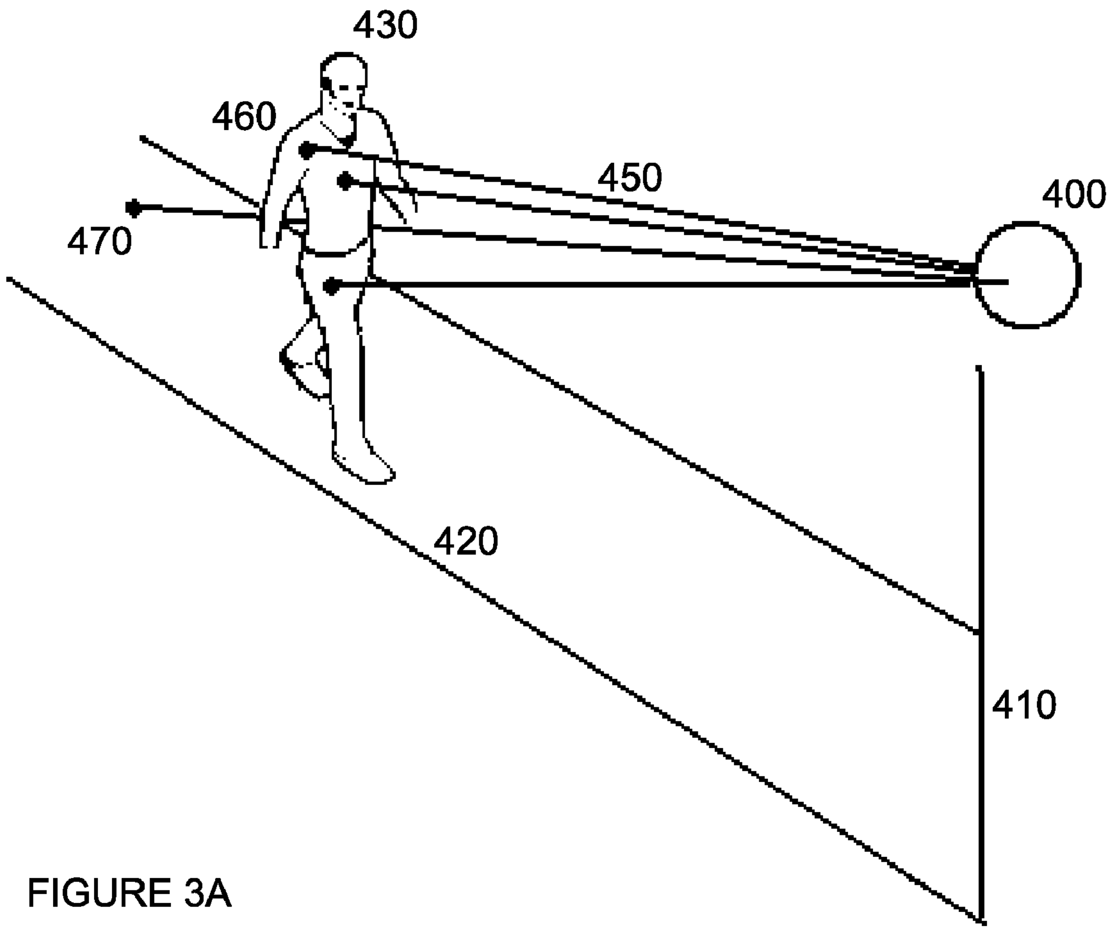
FIG. 3*a*-*b* is a diagram of embodiment usage to enable forward visibility for fire escape.

Referring to FIG. 3*a* at 420 is diagrammed a hallway used for fire escape. At 410 is an exit door. At 400 above the exit door at 410 the embodiment in FIG. 1 at 100 is placed as to illuminate the hallway at 420. More specifically referring to FIG. 1 at 150 the diffraction output is positioned as to illuminate the hallway in FIG. 3*a* at 420. At 450 is diagrammed the line path of the diffraction grating in FIG. 1 at 150 for the embodiment at 100 in FIG. 1. At 430 is a human being. At 460 incident dots appear on human at 430 from diffraction beam line paths shown at 450. At 470 a diffraction beam line path is shown to incident the hallway at 420 missing human being at 430. The human at 430 can acknowledge that a light source at 400 is guiding to an exit.

Figure 3B:
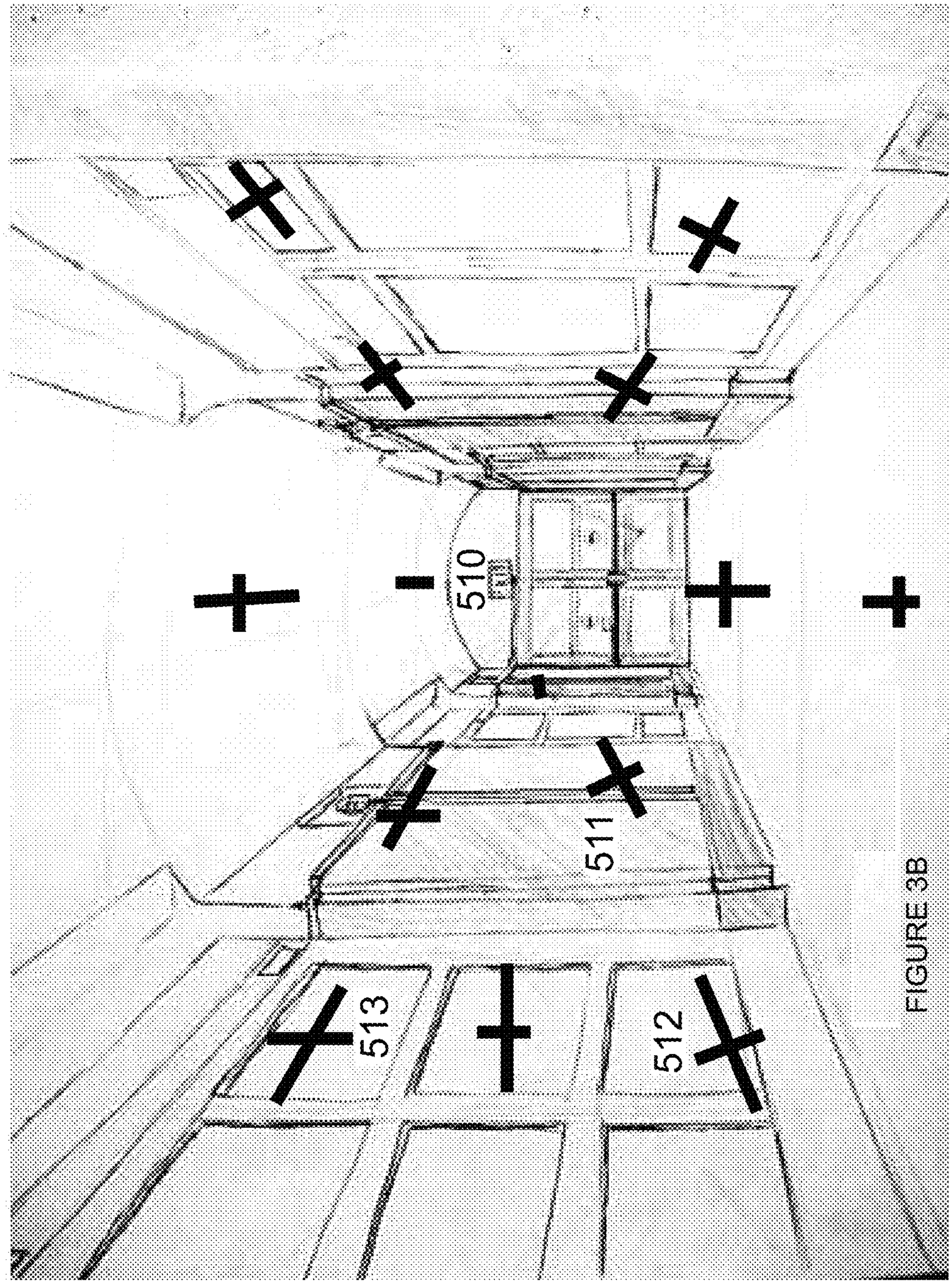

Referring to FIG. 3*b* at 500 is a one point perspective drawing of a hallway. In FIG. 3*b* at 510 the embodiment in FIG. 1 at 100 is placed as to illuminate the hallway in FIG. 3*b* at 500. More specifically referring to FIG. 1 at 150 the diffraction output is positioned as to illuminate the hallway referring to FIG. 3*b* at 500. Referring to FIG. 3*b* at 510 the embodiment location is utilizing a star diffraction grating for the embodiment in FIG. 1 at 130. In FIG. 3*b* at 511, 512, and 513 the diffraction output in FIG. 1 at 150 is shown to produce a one point perspective guidance path for the hallway in FIG. 3*b* at 500.

The result is the visual plane appears parallel to two axes of a rectilinear scene—a scene which is composed entirely of linear elements that intersect only at right angles due to refraction of the coherent light. The method provides a visual perspective of depth and forward looking to assist with night vision navigation to a center point or exit location.

Figure 4:
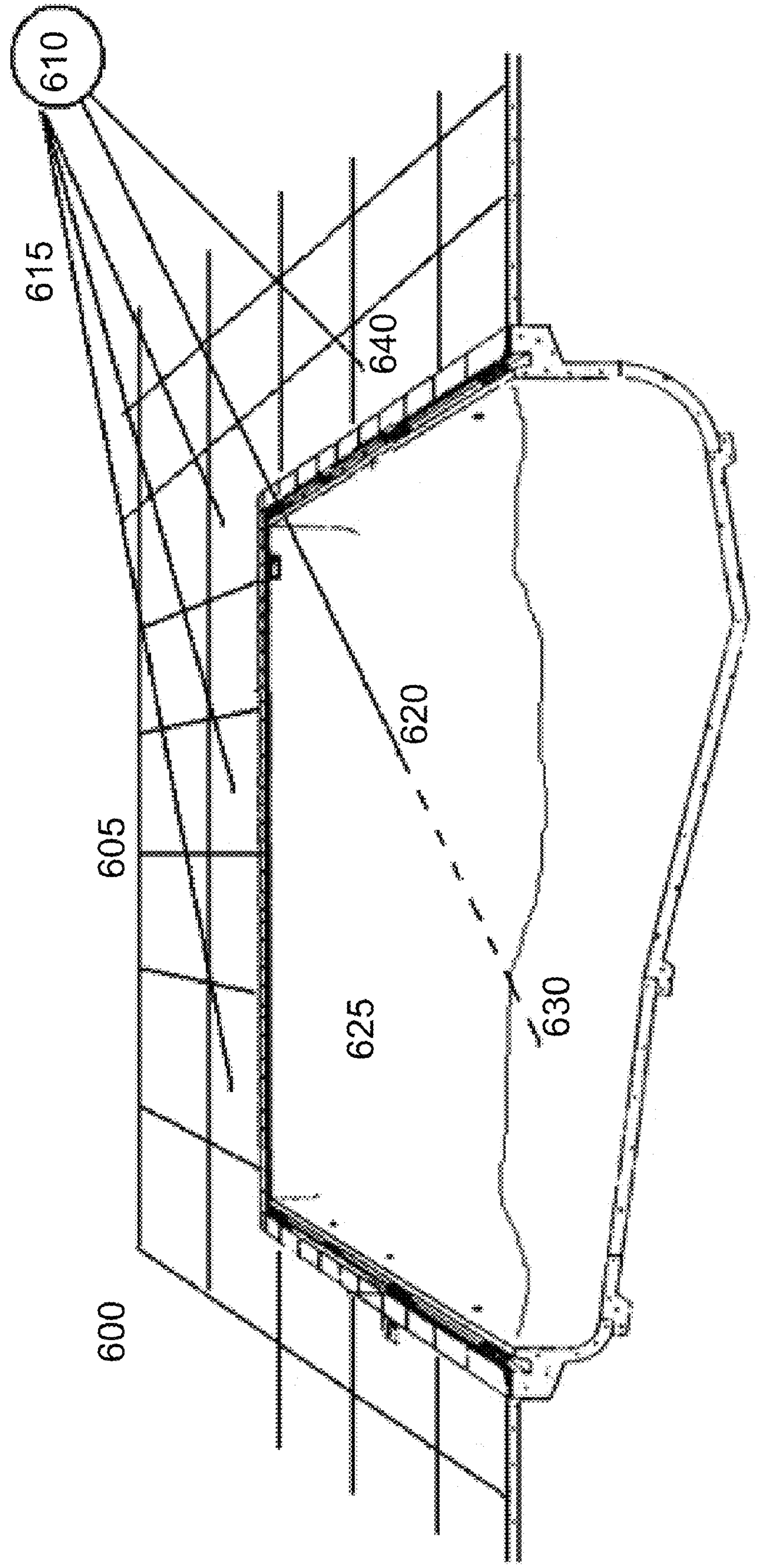
FIG. 4 is a diagram of embodiment usage to outline the pool bounds with clear dots and on water areas with distorted dots.

Referring to FIG. 4 at 600 is an architectural drawing of a pool area. The embodiment in FIG. 1 at 100 is placed at 610 in FIG. 4. More specifically referring to FIG. 1 at 150 the diffraction output is positioned as to illuminate the pool area at 600 in FIG. 4. One skilled in the area of mounting flood safety lights would position embodiment at 610 appropriately. At 615 is diagrammed the line path of the diffraction grating in FIG. 1 at 150 for the embodiment at 100 in FIG. 1. Referring to FIG. 4 at 615 is shown the incident of a refraction line path at 640 for the pool patio at 605. The incidence at 640 is clearly visible to an observer.

At 620 is an incident from a refraction line path at 615 to the pool water at 625. The incident at 620 traverses the depth of the water at 625 and shows diffraction at the pool bottom at 630. The incidence at 620 is not observable or extremely difficult to see for reflection in general. The result to any observer at pool area 600 is clearly the distinction of the pool water area at 625 and the patio at 605.

What is claimed is:

1. A method of operating a Laser Lighting Apparatus comprising, using a diffraction grating of the Laser Lighting Apparatus to light small areas for broad illumination for limited lighting infrastructure, wherein the diffraction grating diffracts laser light into a plurality of beams for producing broad ranged night light with limited shadows, at a distance D, a displacement y of each beam from a central line of the diffraction grating is equal to an order m of the beam times a wavelength λ of the laser light times the distance D divided by a slit separation d of the diffraction grating, and the illumination creates a three dimensional visual effect including lighting dots and lighting lines and the visual effect is a visual plan appearing parallel to two axes of a rectilinear scene.

2. The method of operating the Laser Lighting Apparatus of claim 1, wherein the small areas including a room or a hallway.

3. The method of operating the Laser Lighting Apparatus of claim 1, wherein the diffraction grating is a glyph diffraction grating.

4. A method of operating a Laser Lighting Apparatus comprising, using a diffraction grating of the Laser Lighting Apparatus to provide depth perception and forward visibility for fire escape, wherein the diffraction grating diffracts laser light into a plurality of beams for exit guidance in a fire to limit blinding light and shadows, and at a distance D, a displacement y of each beam from a central line of the diffraction grating is equal to an order m of the beam times a wavelength λ of the laser light times the distance D divided by a slit separation d of the diffraction grating.

5. The method of operating the Laser Lighting Apparatus of claim 4, wherein the light source of the Laser Lighting Apparatus is guiding to an exit.

6. A method of operating a Laser Lighting Apparatus comprising, using a diffraction grating of the Laser Lighting Apparatus for underwater illumination for creative effects, wherein the diffraction grating diffracts laser light into a plurality of beams for producing a broad ranged underwater illumination, and at a distance D, a displacement y of each beam from a central line of the diffraction grating is equal to an order m of the beam times a wavelength λ of the laser light times the distance D divided by a slit separation d of the diffraction grating.

* * * * *